(12) United States Patent
Chhabra et al.

(10) Patent No.: US 12,147,520 B2
(45) Date of Patent: Nov. 19, 2024

(54) DISPLAY VISIBILITY BLOCK

(71) Applicant: Micron Technology, Inc., Boise, ID (US)

(72) Inventors: Bhumika Chhabra, Boise, ID (US); Carla L. Christensen, Boise, ID (US); Radhika Viswanathan, Boise, ID (US); Zahra Hosseinimakarem, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/213,366

(22) Filed: Jun. 23, 2023

(65) Prior Publication Data

US 2023/0334135 A1    Oct. 19, 2023

Related U.S. Application Data

(62) Division of application No. 17/013,401, filed on Sep. 4, 2020, now Pat. No. 11,687,632.

(51) Int. Cl.
*G06F 21/32* (2013.01)
*G06F 21/60* (2013.01)
*G06V 40/12* (2022.01)
*G06V 40/16* (2022.01)
*G06V 40/18* (2022.01)
*G09G 3/3208* (2016.01)

(52) U.S. Cl.
CPC ............ *G06F 21/32* (2013.01); *G06F 21/604* (2013.01); *G09G 3/3208* (2013.01); *G06V 40/1365* (2022.01); *G06V 40/172* (2022.01); *G06V 40/197* (2022.01); *G09G 2358/00* (2013.01)

(58) Field of Classification Search
CPC ........ G06F 21/32; G06F 21/604; G06F 21/84; G06F 21/31; G09G 3/3208; G09G 2358/00; G09G 3/20; G09G 3/2092; G09G 2320/028; G06V 40/1365; G06V 40/172; G06V 40/197
See application file for complete search history.

(56) References Cited

U.S. PATENT DOCUMENTS

| | | |
|---|---|---|
| 2011/0206285 A1 | 8/2011 | Hodge et al. |
| 2016/0210473 A1 | 9/2016 | Cohen et al. |
| 2020/0026114 A1 | 1/2020 | Harrold et al. |
| 2020/0050032 A1 | 2/2020 | Chen et al. |
| 2020/0103516 A1 | 4/2020 | Kim et al. |
| 2020/0159055 A1 | 5/2020 | Robinson et al. |
| 2020/0257155 A1 | 8/2020 | Wang et al. |

*Primary Examiner* — Abhishek Sarma
(74) *Attorney, Agent, or Firm* — Brooks, Cameron & Huebsch, PLLC (57) ABSTRACT

Methods, apparatuses, and non-transitory machine-readable media for displaying information and/or images on a display of a computing device based on received data. Apparatuses can include a display screen, a memory resource, a recognition sensor, and a controller. An example controller can receive data and activate information and/or images on a display screen based in part on the received data. In another example, a method can include storing recognition data in a memory resource, receiving primary recognition data, comparing the primary recognition data to the stored recognition data, and activating the display screen for a viewing angle responsive to authentication of the primary recognition data through the comparison of the primary recognition data and the stored recognition data.

20 Claims, 7 Drawing Sheets

DISPLAY VISIBILITY BLOCK

PRIORITY INFORMATION

This application is a Divisional Application of U.S. application Ser. No. 17/013,401, filed on Sep. 4, 2020 the contents of which are incorporated herein by reference.

TECHNICAL FIELD

The present disclosure relates generally to apparatuses, non-transitory machine-readable media, and methods for determining screen visibility on a display of a computing device based on authentication of data.

BACKGROUND

Images can be viewed on computing devices. A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, heads-up displays, augmented reality and virtual reality devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device can include a display used to view images and/or text. The display can be a touchscreen display that serves as an input device. When a touchscreen display is touched by a finger, digital pen (e.g., stylus), or other input mechanism, associated data can be received by the computing device. The touchscreen display may include pictures and/or words, among others that a user can touch to interact with the device.

DETAILED DESCRIPTION

Apparatuses, machine-readable media, and methods related to displaying images on a display screen of a computing device based on received data are described herein. Computing device display screen (e.g., monitors, mobile device screens, laptop screens, etc.) can be used to view information and/or images (e.g., static images, video images, and/or text) on the display screen. Information and/or images can be received by the computing device from another device and/or generated by the computing device. A user of a computing device may view private and/or confidential information and/or images on the display screen (e.g., viewing location) of the computing device. The private and/or confidential information and/or images may be viewed on a computing device by the user in public locations. For instance, a computing device can include a controller and a memory resource to organize and display the information and/or images on a display screen based on data the user provides the computing device. The data provided by the user may cause the controller to display information and/or images on a display screen. In an example, a method can include storing recognition data in a memory resource, receiving primary recognition data, comparing the primary recognition data to the stored recognition data, and activating the display screen for a viewing angle, measured from a plane normal to the display screen, responsive to authentication of the primary recognition data through the comparison of the primary recognition data and the stored recognition data.

As used herein, the term "viewing location" refers to a display screen of a computing device. A user may view static images, video images, and/or text at the viewing location of the computing device. For example, a user may view information and/or images including static images, video images, and/or text at the viewing location of the computing device. That is, the information and/or images may be displayed on a display screen.

However, viewing information and/or images on a computing device in a public location may allow unauthorized users to view the information and/or images that are displayed on the display screen. For example, an authorized user may view information and/or images on a computing device while in a public location. In some instances, an unauthorized user may be near the authorized user and may view the display screen of the computing device while the authorized user is viewing the display screen. An authorized user may view private and/or confidential information and/or images on a computing device when in a public location and/or when others are around them. An unauthorized user may have access to the display screen of a computing device being used by an authorized user when near an authorized user. Thus, giving an unauthorized user access to the private and/or confidential information and/or images on the display screen of the computing device being used by the authorized user.

As used herein, the term "recognition data" refers to data used to identify an authorized user. For instance, recognition data may include fingerprint identification, facial identification, retina identification, alphanumerical identification, and/or pattern identification, for example. As used herein, the term "stored recognition data" refers to recognition data that is stored in a memory resource of a computing device. The stored recognition data may be compared to primary recognition data and/or secondary recognition data to identify an authorized user. A user may manually enter recognition data into the computing device and the computing device may store the recognition data in the memory resource of the computing device for later reference and identification of an authorized user. A user with stored recognition data in the computing device may be an authorized user. For example, a user may provide recognition data to store in a memory resource before a selective block is enabled. The recognition data provided by the user may identify the user as an authorized user to activate a display screen when a selective block is enabled. For instance, the recognition data provided may allow the computing device to identify a specific user and the specific user may be an authorized user.

As used herein, the term "primary recognition data" refers to recognition data used to identify an authorized user and activate a display screen from a deactivated state.

For example, a user may input the recognition data to a computing device such as a mobile device (e.g., a smartphone) equipped with a recognition sensor (e.g., a camera, fingerprint reader, retina scanner, etc.) to activate a display screen of a computing device within a viewing angle. A computing device may receive (or otherwise obtain) recognition data from a user and authenticate the primary recognition data prior to activating the display screen within a viewing angle. The computing device may identify an authorized user with primary recognition data before displaying information and/or images on the display screen. As used herein, the term "secondary recognition data" refers to recognition data used to identify an authorized user and maintain an activate a display screen.

As used herein, the term "authorized user" refers to a user with stored recognition data in the memory resource of the computing device. For example, a user may provide recognition data to a computing device and the computing device may store the recognition data in the memory of the computing device. The computing device may compare primary recognition data and/or secondary recognition data to stored recognition data to determine if a user is an authorized user. As used herein, the term "unauthorized user" refers to a user without stored recognition data in the memory resource of the computing device.

A computing device may activate a display screen within a viewing angle in the presence of an authorized user. For instance, before a user is able to view information and/or images on a computing device, the user may input primary recognition data into the computing device. The computing device may analyze the primary recognition data and determine if the user is an authorized user. For example, the computing device may compare the primary recognition data from the user with the stored recognition data to determine if the primary recognition data matches the stored recognition data. If the primary recognition data matches the stored recognition data, then the computing device identify the user as an authorized user and activate the display screen within a viewing angle for the authorized user. The activated display screen may allow the authorized user to view information and/or images on the display screen within a viewing angle. If the primary recognition data does not match the stored recognition data, then the computing device may identify the user as an unauthorized user and the display screen may remain deactivated. That is, the unauthorized user may not view information and/or images on the display screen.

Examples of the present disclosures may provide privacy to a user of a computing device by preventing unauthorized users from viewing information and/or images on a display screen. In an example embodiment, a user may activate the display screen of a computing device within a viewing angle by providing primary recognition data to the computing device. The activated display screen may be viewable within a viewing angle measured from a plane normal to the display screen. Said differently, an authorized user may activate a display screen within a viewing angle and prevent unauthorized users outside of the viewing angle from viewing the information and/or images on the display screen. That is, an authorized user may view information and/or images on the display screen of the computing device while preventing unauthorized users from view the same information and/or images on the display screen.

Further, the computing device may receive secondary recognition data while a user is viewing the information and/or images on the display screen. For example, the computing device may receive primary recognition data from a user to determine if the user is an authorized user. Once it is determined if a user is an authorized user, the user may view information and/or images on the display screen within a viewing angle. Furthermore, the computing device may continue to receive secondary recognition data as the user views the information and/or images on the display screen within a viewing angle. That is, the computing device may scan for secondary recognition data substantially continuously, periodically, or at scheduled intervals to ensure that the authorized user is still within the viewing angle of the display screen. If it is determined that the authorized user is no longer within the viewing angle, the display screen may deactivate and the information and/or images on the display screen may no longer be viewable.

A user may determine the frequency of the secondary recognition data scans. For example, a user may determine the frequency of the secondary recognition data scans by setting the frequency of the scan on the computing device. In another embodiment, the computing device may analyze the usage patterns of the user and set the frequency of the secondary recognition data scans based on the usage patterns of the user.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," "M," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory resources) can refer to one or more memory resources, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 222 can reference element "22" in FIG. 2, and a similar element can be referenced as 322 in FIG. 3. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Figure 1:
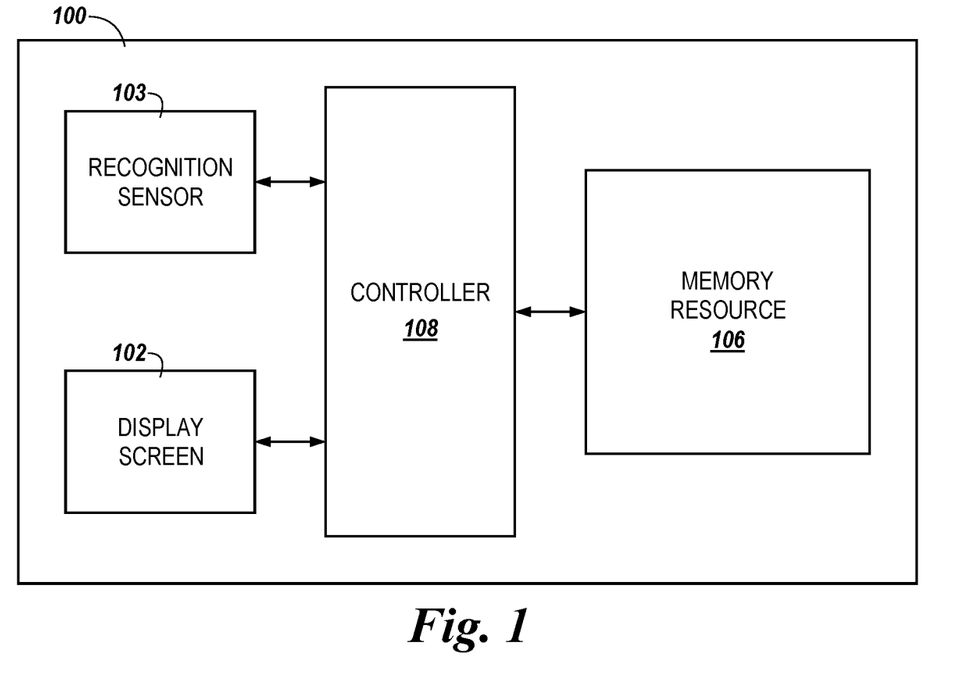
FIG. 1 is a functional block diagram in the form of an apparatus having a display screen, a recognition sensor, a memory resource, and a controller in accordance with a number of embodiments of the present disclosure.

FIG. 1 is a functional block diagram in the form of an apparatus 100 having a display screen 102, a recognition sensor 103, a memory resource 106, and a controller 108 (e.g., a processor, control circuitry, hardware, firmware, and/or software) in accordance with a number of embodiments of the present disclosure. The memory resource 106, in some embodiments, can include a non-transitory MRM.

The computing device 100 may include a display screen 102. The display screen 102 may be a touchscreen display of a mobile device such as a smartphone. In some embodiments, the computing device 100 may include a light emitting diode (OLED) screen, a micro light emitting diode (uLED) screen, or a liquid crystal display (LED) screen. The controller 108 may be communicatively coupled to the memory resource 106 and/or the display screen 102. As used herein, "communicatively coupled" can include coupled via various wired and/or wireless connections between devices such that data can be transferred in various directions between the devices. The coupling need not be a direct connection, and in some examples, can be an indirect connection.

The memory resource 106 can include non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPointm), resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random access memory (SRAM), among others.

A computing device can include a recognition sensor 103. The recognition sensor 103 may detect, receive, and/or scan for recognition data. For example, the recognition sensor 103 may capture and/or receive input, such as recognition data, from a user and transmit that input to the controller 108 to be analyzed. The primary recognition data from an authorized user may cause a display screen to activate within a viewing angle. The viewing angle may be within a 10 to 25 angle of the display screen. As used herein, the term "recognition sensor" refers to a device used to receive and/or scan for recognition data from a user.

A user may cause a display screen 102 of a computing device 100 to activate within a viewing angle by inputting primary recognition data into the recognition sensor 103. The controller 108 of the computing device 100 may analyze the primary recognition data and determine if the user is an authorized user. If the controller 108 determines that the user is an authorized user, the controller 108 may cause the display screen 102 of the computing device 100 to activate within a viewing angle. That is, the display screen 102 may show information and/or images within a specified viewing angle of the display screen 102. Said differently, the controller 108 may activate a display screen 102 in a manner that prevents others outside of a viewing angle from seeing the information and/or images on the display screen 102, providing the user of the computing device 100 with privacy when others are nearby. As used herein, the term "viewing angle" refers to a specified angle from a display screen that information and/or images may be viewable on a display screen. That is, outside the specified angle information and/or images may not be viewable on the display screen 102.

The controller 108 of the computing device 100 may regulate the polarization of the display screen 102 to increase and/or decrease the visibility of information and/or images on a display screen 102. For example, the controller may cause the display screen 102 to transition between opaque and transparent based on the signals that are provided. As such, the controller may regulate the portion of the display screen 102 that is visible. The controller 108 may regulate the polarization of the display screen 102 to increase the visibility of the information and/or images within a specified viewing angle and decrease the visibility of the information and/or images outside of the specified viewing angle. Said differently, user may provide a computing device 100 with primary recognition data and a controller 108 may analyze the primary recognition data received by a recognition sensor 103 to authenticate the primary recognition data and identify an authorized user. Display screen 102 can include a polarizer, such as a wire grid polarizer. The polarizer can be activated to increase the visibility of the information and/or images within a specified viewing angle and/or decrease the visibility of the information and/or images outside of the specified viewing angle. The polarizer can be configured, when activated, to have a bi-direction scatter function (BDSF) that limits the angle at which light is emitted from display screen 102 and therefore decreases the visibility of the information and/or images outside of the specified viewing angle that corresponds to the angle of light being emitted from the display screen. The viewing angle of the display screen when the polarizer is activated can correspond to the BDSF of the polarizer. The BDSF of the polarizer can be based on the materials comprising the polarizer, the depth of the material forming wire grid (e.g., the trench dept of the wire grid), and/or design (e.g., shape and/or spacing) of the wire grid, which can be configured, along with the cover (e.g., glass) of the display screen 102, such that the display screen can have a particular viewing angle when the polarizer is activated. When a user is determined to be an authorized user by the controller 108, the controller 108 may adjust the polarization on the display screen 102 (e.g., activate a polarizer) so that the information and/or images on the display screen 102 are visible within a viewing angle ranging from about 10 to 25 degrees from the display screen. In addition, the controller 108 may adjust the polarization of the display screen 102 (e.g., activate a polarizer) in a manner that makes the information and/or images on the display screen 102 unable to be seen outside of the viewing angle. Said differently, the controller 108 may adjust the polarization on the display screen 102 so that the information and/or images on the display screen 102 are visible to the authorized user and not an unauthorized user outside the viewing angle.

The recognition sensor 103 may receive primary recognition data and/or secondary recognition data from a user. The controller 108 uses the primary recognition data received from the recognition sensor 103 to determine if a user is authorized to view the information and/or images on the display screen 102. For example, a recognition sensor 103 can be coupled to the display screen 102 either directly or indirectly via the controller 108. The controller 108 can be configured to receive an input, such as primary recognition data and/or secondary recognition data, from the recognition sensor 103 when determining if a user is an authorized user. In some embodiments, the recognition sensor 103 may be a camera and may provide input to the controller 108 as facial identification. The controller 108 may use the facial identification to identify a user. For example, the recognition sensor 103 may be a camera of a mobile device (e.g., a smartphone) configured to receive facial identification. The camera (e.g., recognition sensor 103) may send the received facial identification to the controller 108.

In a non-limiting example, a user can provide recognition data to the recognition sensor 103 (e.g., camera) in the form of facial identification. That is, the controller 108 may determine if a user is an authorized user with facial identification provided by the recognition sensor 103 (e.g., camera). If the facial identification is authenticated by the controller 108 and determined to be from an authorized user, the controller 108 may activate the display screen 102 within a viewing angle allowing a user within the viewing angle to view information and/or images on the display screen 102 and preventing users outside the viewing angle from viewing the information and/or images on the display screen 102.

In another embodiment, the recognition sensor 103 may be a fingerprint reader. For example, the recognition sensor 103 can be a portion of a mobile device including a fingerprint reader. In some embodiments, the recognition sensor 103 in the form of a fingerprint reader may be connected to the display screen. In other embodiments, the fingerprint reader may be on other portions of a mobile device (e.g., the back of the smartphone).

In another non-limiting example, a user can provide primary recognition data to the recognition sensor 103 (e.g., fingerprint reader) in the form of fingerprint identification. That is, the controller 108 may determine if a user is an authorized user with fingerprint identification provided by the recognition sensor 103 in the form of a fingerprint reader. The controller 108 may activate a screen visibility within a viewing angle with received fingerprint identification from an authorized user. Activating the screen visibility of a display screen 102 within a viewing angle may allow a user within the viewing angle to view information and/or images on the display screen 102. The viewing angle may be a 10 to 25 degree angle from the display screen 102 of the computing device 100. Activating the screen visibility within a viewing angle gives a user within the viewing angle privacy and ensures that others outside of the viewing angle cannot see the information and/or images on the display screen 102.

In another embodiment, the recognition sensor 103 may be a retina scanner and may provide recognition data input to the controller 108 as retina identification to identify a user. For example, the recognition sensor 103 may be a portion of a mobile device including a retina scanner. In some examples, the retina scanner may be a camera connected to the computing device 100.

In yet another non-limiting example, a user can provide primary recognition data to the recognition sensor 103 in the form of retina identification. The retina identification may be used to activate a display screen 102 of a computing device within a viewing angle. For example, a user may look into a recognition sensor 103 in the form of a camera to provide the recognition sensor 103 with recognition data in the form of retina identification. The primary recognition data may be used to identify a user as an authorized user. The controller 108 may then activate the display screen 102 within a viewing angle for the authorized user and other users within the viewing angle.

In some embodiments, the recognition sensor 103 may be an alphanumeric identification code and may provide recognition data to the controller 108 in the form of an alphanumeric identification code input to identify an authorized user. For example, the recognition sensor 103 may be part of a touch display screen 102 of a mobile device. The display screen 102 may allow a user to input an alphanumeric identification code and the controller 103 may authenticate the alphanumeric identification code to determine if the user is an authorized user.

The alphanumeric identification code may be used to activate a display screen 102 of a computing device and allow a user to view information and/or images on the display screen 102 within a viewing angle. The display screen 102 may be activated within a specified viewing angle and may prevent others outside of the specified viewing angle from viewing the information and/or images on the display screen 102. Preventing others from viewing information and/or images on a display screen 102 may provide an authorized user with added security when viewing confidential and/or private information and/or images in public and/or in the presence of other people.

In another embodiment, the recognition sensor 103 may be a pattern identification code and may provide recognition data to the controller 108 as a pattern identification code input to identify a user. For example, the display screen 102 may act as a touch display screen including an input for a pattern identification code. As a user inputs the pattern identification code a controller 108 may unlock the computing device 100 and allow an authorized user to view information and/or images on the display screen 102 within a viewing angle. The identified authorized user may privately view the information and/or images on the display screen 102 within a viewing angle even in the presence of others. That is, the controller 108 may allow users within a specified angle to view the information and/or images on the display screen 102 while preventing others outside the specified angle from viewing the information and/or images on the display screen 102.

In some embodiments, the computing device 100 may include number of recognition sensors 103. For example, the computing device 100 may include a recognition sensor to receive the facial identification, fingerprint identification, retina identification, alphanumeric identification code, pattern identification code, or a combination thereof to identify an authorized user. The controller 108 may authenticate a primary recognition data to activate a display screen 102 within a viewing angle, where the viewing angle is measured from a plane normal to the display screen 102, and authenticate a secondary recognition data to maintain the activated display screen 102.

The controller 108 may determine if a user is an authorized user by comparing the received primary recognition data and/or secondary recognition data with stored recognition data. If the received primary recognition data and/or secondary recognition data matches the stored recognition data, then the primary recognition data and/or secondary recognition data may be authenticated and the user may be determined to be an authorized user. In some embodiments, a user may store recognition data in the memory resource 106 of the computing device 100 as a reference. That is, a user may store recognition data in the memory resource 106 of the computing device 100 to identify a user as an authorized user. The user may store recognition data in the memory resource 106 of the computing device 100 before enabling a selective block. As used herein, the term "selective block" refers to the act of making information and/or images on a display screen visible within a specified angle. The recognition data stored in the memory resource 106 of the computing device 100 is used to authenticate a primary recognition data and/or secondary recognition data by comparing received primary recognition data and/or secondary recognition data with the recognition data stored in the memory resource 106 and determining that the primary recognition data and/or secondary recognition data was provided from an authorized user.

For example, a user may select via a menu displayed on the display screen 102 which recognition data (e.g., the facial identification, fingerprint identification, retina identification, alphanumeric identification code, pattern identification code, etc.) to store. Such a menu may give the user options as to what recognition data the user wants to store and/or use to identify an authorized user. The user can manually select and customize which recognition data and recognition sensor 103 to be used by the controller 108 when authenticating a primary recognition data and/or secondary recognition data. In some embodiments, a user may input a number of recognition data and select a number of recognition sensors to identify an authorized user.

Figure 2:
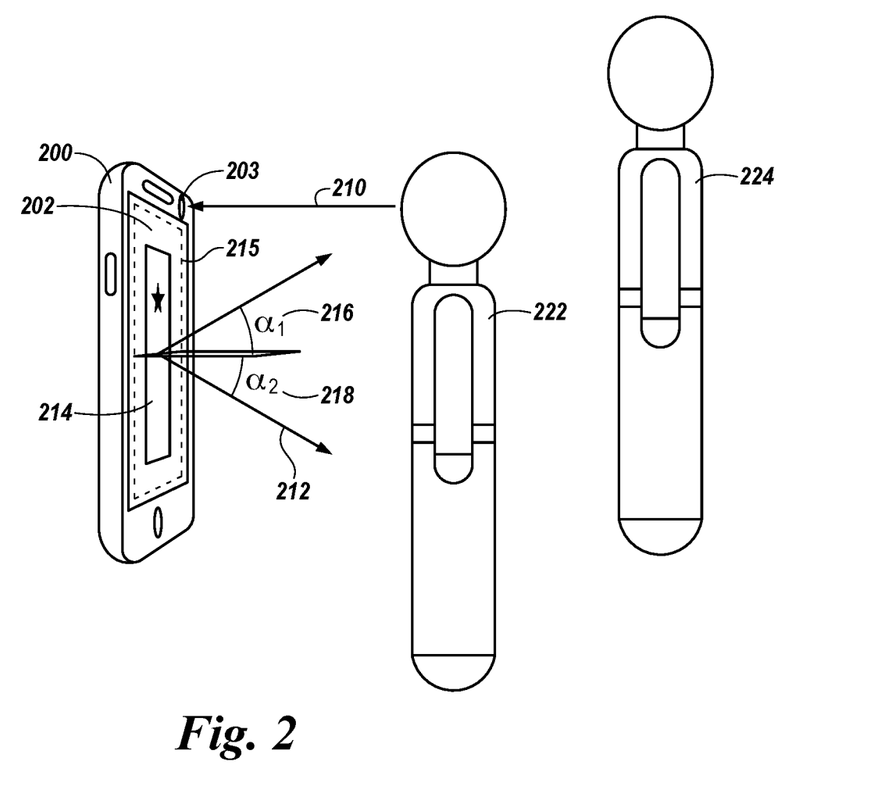
FIG. 2 is a diagram representing an example computing device including a visible image on a display screen in the form of a mobile device in accordance with a number of embodiments of the present disclosure.

FIG. 2 is a diagram representing an example computing device 200 including a visible image 214 on a display screen 202 in the form of a mobile device in accordance with a number of embodiments of the present disclosure. While the depiction of FIG. 2 includes an illustration of a star as image 214, any static image, video image, text, or information could be used. FIG. 2 illustrate a display screen 202 which is analogous to the display screen 102 of FIG. 1. The display screen 202 may be part of a computing device 200 and may be coupled to a controller (e.g., the controller 108 of FIG. 1) and a memory resource (e.g., the memory resource 106 of FIG. 1). FIG. 2 includes an image 214. FIG. 2 also illustrate an authorized user 222 and an unauthorized user 224. While the FIG. 2 is illustrated as including two users, there may be more or less users. Further, while the depiction of FIG. 2 includes an illustration of a human, any animal or device could be used.

FIG. 2 illustrates the display screen 202 including the visible image 214. In the illustration in FIG. 2, the computing device 200 is in an initial position where the authorized user 222 may be facing the display screen 202 such that the image 214 is visible to the authorized user 222.

In FIG. 2, the image 214 is visible to the authorized user 222 within the viewing angel 212. In contrast, the image 214 is not visible to the unauthorized user 224 outside of the viewing angel 212. The controller of the computing device 200 may adjust the polarization of the display screen 202 based on the set viewing angle when a selective block is enabled. Said differently, the controller of the computing device 200 may alter the polarization of the display screen to regulate which users (e.g., authorized user 222 or unauthorized user 224) are able to view the image 212 on the display screen 202. The controller of the computing device 200 may alter the polarization of the display screen 202 so that images 214 are only visible within the viewing angle 212. That is, users outside the viewing angle 212 (e.g., unauthorized user 224) cannot view the image 214 on the display screen 202. While the position of the authorized user 222 is in front of the computing device 200, the authorized user 222 could be oriented anywhere within the viewing angle 212 and view the image 214 on the display screen 202.

In a number of embodiments, display screen 202 can include a polarizer 215, such as a wire grid polarizer. The polarizer 215 can be activated to increase the visibility of the information and/or images within a specified viewing angle and/or decrease the visibility of the information and/or images outside of the specified viewing angle. The polarizer 215 can be configured, when activated, to have a bi-direction scatter function (BDSF) that limits the angle at which light is emitted from display screen 202 and therefore decreases the visibility of the information and/or images outside of the specified viewing angle that corresponds to the angle of light being emitted from the display screen. The viewing angle of the display screen when the polarizer 215 is activated can correspond to the BDSF of the polarizer 215. The BDSF 215 of the polarizer can be based on the materials comprising the polarizer, the depth of the material forming wire grid (e.g., the trench dept of the wire grid), and/or design (e.g., shape and/or spacing) of the wire grid, which can be configured, along with the cover (e.g., glass) of the display screen 202, such that the display screen can have a particular viewing angle when the polarizer 215 is activated.

In some examples, the viewing angle 212 may be from about 5 to about 25 degrees from the display screen 202. In another example, the viewing angle 212 may be from about 10 to about 20 degrees from the display screen 202. Viewing angle can be measured from a plane that is perpendicular (e.g., normal) to the surface of the display screen 202. Viewing angle 212 can be comprised of a first angle 216, which can be 10 degrees, and a second angle 218, which can be 10 degrees, for a viewing angle of 20 degrees. First angle 216 can be the same or difference from second angle 218, such that first angle 216 can be 10 degrees and second angle 218 can be 5 degrees for a viewing angle of 15 degrees. The plane that is perpendicular to the display screen from which the viewing angle is measured can be at any location on the display screen and can be oriented at any angle relative to the edge of the display screen. For example, in FIG. 2, the plane is approximately parallel to the top and bottom edges of the display screen 202, but the plane could be perpendicular to the tope and bottom edges of the display screen 202 or at a 15 degree angle to the top and bottom edges of the display screen 202. In yet another example, the viewing angle 212 may be from about 10 to about 15 degrees from the display screen 202. The viewing angle may be set by a user before enabling a selective block. However, this disclosure is not so limited. In some examples, the viewing angle may be a default viewing angle set by the controller 108.

The computing device 200 may include recognition sensor 203 to receive recognition data 210 from a user (e.g., an authorized user 222). The controller of the computing device 200 may use the received primary recognition data 210, obtained from the recognition sensor 203, to determine if the user is an authorized user 222. If a user is determined to be an authorized user 222, the controller may activate a screen visibility and cause an image 214 to be visible within the viewing angle 212.

In some examples, the recognition sensor 203 may scan for secondary recognition data 210 while the display screen is activated within a viewing angle 212. Said differently, the recognition sensor 203 may continue to receive and/or scan for secondary recognition data 210 after the controller has determined that an authorized user 222 provided the primary recognition data 210 and activated the display screen 202. That is, the recognition sensor 203 may receive and/or scan for secondary recognition data 210 substantially continuously, periodically, or at scheduled intervals to ensure that the authorized user 222 is still viewing the display screen within a viewing angle 212. As used herein, the term "substantially" refers to a characteristic does not have to be absolute but is close enough so as to achieve the characteristic. For example, "substantially continuously" is not limited to absolutely continuous. As used herein, the term "periodically" refers to a regularly occurring time. For example, the recognition sensor 203 may obtain secondary recognition data from a user every 2 minutes, 5 minutes, or every 10 minutes, or every 15 minutes. As used herein, the term "scheduled intervals" refers to varying time gaps set by a user and/or controller. For example, a user may set the recognition sensor 203 to scan for recognition data 2 minutes after a display screen is activated and then 5 minutes after the last scan was obtained.

In a non-limiting example, a user (e.g., authorized user 222) may provide the recognition sensor 203 with primary recognition data 210. The controller of the computing device 200 may authenticate the received recognition data 210 to determine if the user is an authorized user 222. The controller may determine that the user is an authorized user 222 and activate the display screen 202 allowing the authorized user 222 to view the image 214 on the display screen 202 with in a viewing angle 212. In some examples, the recognition sensor 203 may perform substantially continuously scan for secondary recognition data 210 after an authentication has occurred to ensure that the authorized user is still within the viewing angle 212 of the display screen 202. If it is determined that the authorized user 222 is still within the viewing angle 212, the display screen 202 may remain activated. If it is determined that the authorized user 222 is no longer within the viewing angle 212, the display screen 202 may deactivate.

In another non-limiting example, the recognition sensor 203 may perform periodic scan for secondary recognition data 210 after an authentication has occurred to ensure that the authorized user is still within the viewing angle 212 of the display screen 202. If it is determined that the authorized user 222 is no longer within the viewing angle 212 and an unauthorized user 224 is within the viewing angle 212, the display screen 202 may deactivate.

In yet another non-limiting example, a user (e.g., unauthorized user 224) may provide the recognition sensor 203 with primary recognition data 210. The controller of the computing device 200 may attempt to authenticate the received primary recognition data 210 to determine if the user is an authorized user 222. However, if the received primary recognition data 210 does not match the recognition data stored in the memory resource of the computing device 200, the control may cause the display screen 202 to remain deactivated.

Figure 3:
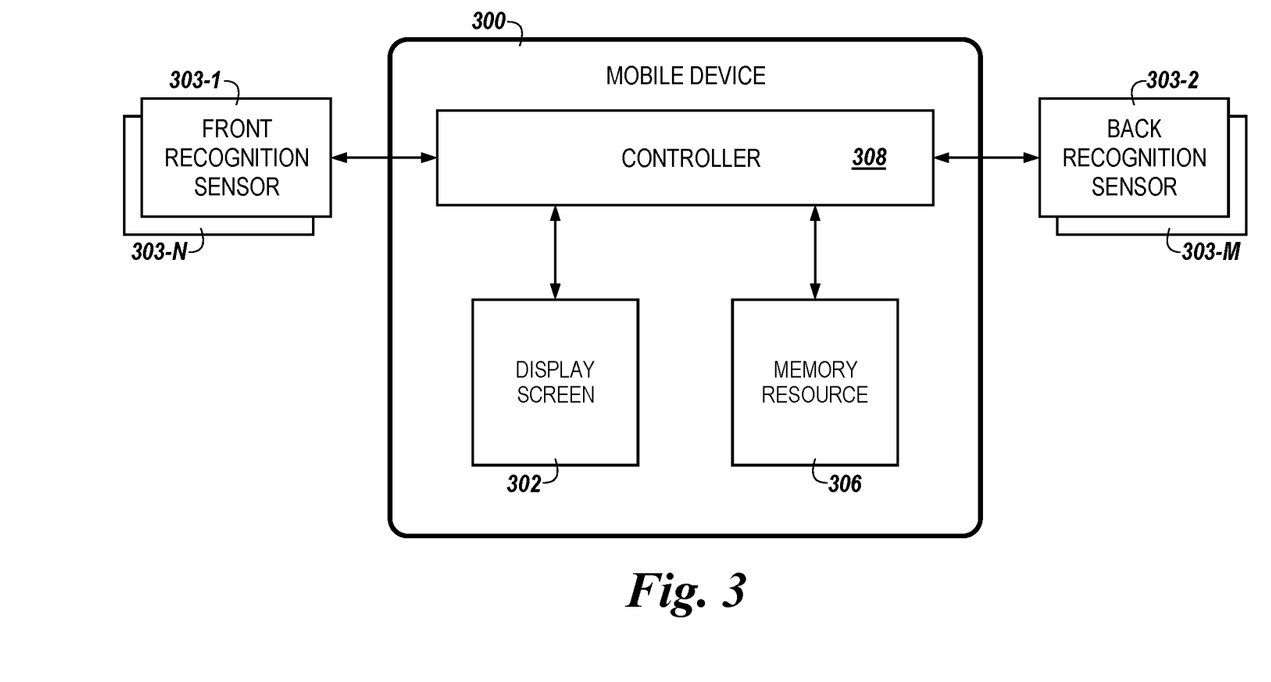
FIG. 3 is diagram representing an example computing device including a display screen, recognition sensors, a memory resource, and a controller in form of a mobile device in accordance with a number of embodiments of the present disclosure.

FIG. 3 is diagram representing an example computing device 300 including a display screen 302, recognition sensors 303, a memory resource 306, and a controller 308 in the form of a mobile device in accordance with a number of embodiments of the present disclosure. The computing device 300 may include a controller 308 which may be analogous to controller 108 described in FIG. 1. The computing device 300 may be communicatively coupled to one or more recognition sensors in the form of a front recognition sensors 303-1 and 303-N and a back recognition sensors 303-2 and 303-M which can be generally referred to as the recognition sensors 303 and be analogous to recognition sensors 103 and 203 described in connection with FIGS. 1 and 2, respectively. The computing device 300 can include a memory resource 306 which can be analogous to memory resource 106 described in connection with FIG. 1. Embodiments including memory resource 306 may include any number or combination of memory media types (e.g., non-volatile and/or volatile).

The example computing device 300 is in the form of a mobile device (e.g., an IoT enabled device). An IoT enabled device may include mobile phones, smart phones, tablets, phablets, computing devices, implantable devices, vehicles, home appliances, smart home devices, monitoring devices, wearable devices, devices enabling intelligent shopping systems, among other cyber-physical systems. The recognition sensors 303 may include multiple types of recognition sensors (e.g., a camera, fingerprint reader, retina scanner, etc.) located on the computing device 300 in the form of a mobile device.

For example, a user may provide the computing device 300 with recognition data in the form of facial identification, fingerprint identification, retina identification, alphanumeric identification code, pattern identification code, etc. The controller 308 may store the initial recognition data in the memory resource 306. In some examples, the computing device 300 in the form of a mobile device may include a number of recognition sensors 303. Further, a user may provide the computing device 300 with a number of recognition data to store and scan. In addition, the controller 308 may store a number of recognition data in the memory resource 306.

In some embodiments, to ensure that an authorized user is still viewing the display screen 302, the recognition sensors 303 may continue to receive and/or scan for recognition data after the controller 308 determines that an authorized user has provided the recognition data. The controller may perform secondary authentication of the user to ensure that the information and/or images on the display screen 302 are viewed by an authorized user. In some examples, the controller 308 may receive recognition data from a number of recognition sensors 303. For example, a user may provide recognition data to a back recognition sensor 303-2 to activate a display screen 302 within a viewing angle. After a specified amount of time has passed the controller 308 may cause a front recognition sensor 303-1 to scan for secondary recognition data to ensure that the authorized user is within the viewing angle. If an authorized user is no longer within the viewing angle, the controller 308 may deactivate the display screen 302. If an authorized user is still within the viewing angle, the display screen 302 will remain activated.

In another non-limiting example, the controller 308 may receive recognition data from a front recognition sensor 303-1 to activate a display screen 302 within a viewing angle. The controller may then cause front recognition sensor 303-1 to substantially continuously scan for recognition data to ensure that an authorized user is within the viewing angle. In yet another non-limiting example, the controller 308 may receive recognition data from a front recognition sensor 303-1 to activate a display screen 302 within a viewing angle. The controller 308 may then cause front recognition sensor 303-N to scan for secondary recognition data periodically to ensure that an authorized user is within the viewing angle.

In some embodiments, the controller 108 may enable a selective blocking of a display screen 302 on a computing device 300 based on received recognition data. For example, the controller 308 may receive primary recognition data from a recognition sensor 303. The primary recognition data may be provided by a user in efforts to activate a display screen 302 within a viewing angle and view information and/or images thereon. The controller 308 may analyze the primary recognition data by comparing the received primary recognition data to the recognition data stored in the memory resource 306. If it is determined that the received primary recognition data matches the stored recognition data, the controller 208 may activate a displays screen 302 within a specified view angle. This may allow the user to view the information and/or images on the display screen 302 in private and prevent other users outside of the viewing angle from viewing the information and/or images on the display screen 302.

In some embodiments, a computing device 300 may be a mobile device including a number of applications (e.g., picture gallery, email, text messaging, games, social media, etc.). As used herein, the term "application" refers to a program designed to run on a computing device, such as a mobile device, smartphone, or tablet computer, for example. The controller 308 may enable selective blocking of a display screen 302 for specified applications on the computing device 300. For example, the controller 308 may enable selective blocking of a display screen 302 for a first application and disable the selective blocking of the display screen 302 for a second application.

In a non-limiting example, a user may use a mobile device to play a game application (e.g., second application). While the user is playing the game application (e.g., second application), the display screen 302 may be visible from all angles. That is, the controller 308 may disable a selective block when the game application (e.g., second application) is used. Once the user exits the game application (e.g., second application) and enters a text messaging application (e.g., first application) the controller 308 may cause the display screen 302 to deactivate until the primary recognition data is authenticated and the user is determined to be an authorized user. That is, the controller 308 may enable a selective blocking of the display screen 302 when the text messaging application (e.g., first application) is used. If the controller 308 determines that the user is an authorized user, the controller 308 may activate the display screen 302 within a specified viewing angle, allowing users within the viewing angle to view information and/or images on the display screen 302 while preventing users outside the viewing angle from viewing the information and/or images. When the user exits the messaging application (e.g., first application), the controller 308 may disable the selective blocking of the display screen 302, allowing users from all angles to view the display screen 302.

In some embodiments, the controller 308 may enable a selective blocking of a display screen 302 for a first application and second application but disable the selective blocking for a third application. In another embodiment, the controller 308 may enable a selective blocking for all applications. In yet another embodiment, the controller 308 may enable a selective blocking based on the location of the user. In addition, the controller 308 may enable the selective blocking based on the location of the user and the application being used. For example, the controller 308 may enable the selective blocking when a user activates a first application while in a public location.

In a non-limiting example, a user may use a mobile device to play a game application (e.g., second application). However, when a user enters the game application (e.g., second application) the controller 308 may cause the display screen 302 to deactivate until the primary recognition data is authenticated and the user is determined to be an authorized user. If the controller 308 determines that the user is an authorized user, the controller 308 may activate the display screen 302 within a specified viewing angle. Once a user exits the game application (e.g., second application) and enters a home screen the controller 308 may disable selective block, allowing the information and/or images on the display screen 302 to be viewed from all angles. Once the user enters a text messaging application (e.g., first application) the controller 308 may activate the selective block and cause the display screen 302 to deactivate until the user is identified as an authorized user. If the controller 308 determines that the user is an authorized user, the controller 308 may activate the display screen 302 within a specified viewing angle, allowing only users within the viewing angle to view information and/or images on the display screen 302. In some examples, the controller 308 may enable the selective blocking on all applications and the home screen.

In some embodiments, a controller 308 may enable and/or disable selective blocking of a display screen 302 for an application based on user pre-established settings, an anticipated level of privacy, pre-determined or machine learned preference, or a combination thereof. That is, the controller 308 may determine a privacy threshold for applications on a computing device 300. The privacy threshold may determine if a selective block should be enabled or disabled for an application. The controller 308 may determine the privacy threshold based on user pre-established settings, an anticipated level of privacy, pre-determined or machine learned preference, or a combination thereof.

For example, a controller 308 may determine that applications have a high privacy threshold and enable the selective blocking based on user selected applications. For instance, a user may select which applications of a mobile device should include a selective blocking and which application should not include a selective blocking. The applications selected by the user to include selective blocking may be determined, by the controller 308, to have a high privacy threshold. In contrast, the applications selected by the user to not include selective blocking may be determined, by the controller 308, to have a low privacy threshold.

In a non-limiting example, a user may select a picture gallery application and a text messaging application to include selective blocking of the display screen 302 and select that the email applications and social media applications should not include selective blocking of the display screen 302. As a result, the controller 308 may enable a selective blocking when the picture gallery application and the text messaging application are initiated but not when the email applications and social media applications are initiated.

In some examples, a controller 308 may enable the selective blocking based an anticipated level of privacy. For example, the controller 308 may determine the privacy threshold of an application based on application description, information provide while using the application, etc. In a non-limiting example, a user may receive an email in an email application with the words confidential in the body of the email. The controller 308 may determine that the email application has a high privacy threshold and enable selective blocking for the email application based on the information provided in the email. In another non-limiting example, a controller 308 may determine that a banking application has a high privacy threshold, based on a description mentioning bank account information, and enable selective blocking for the banking application. In contrast, the controller 308 may determine that a gaming application has a low privacy threshold since the application description mentions nothing of a confidential nature and disable selective blocking for the gaming application.

In some examples, a controller 308 may determine the privacy threshold of an application based on user input. For example, a controller 308 may enable and/or disable selective blocking for an application based on pre-determined or machine learned preferences of a user. In non-limiting example, a user may dim the brightness of the display screen 302 each time a picture gallery application is opened. The controller 308 may determine that the picture gallery application has a high privacy threshold, based on the input from the user, and enable selective blocking for the picture gallery application.

Figure 4:
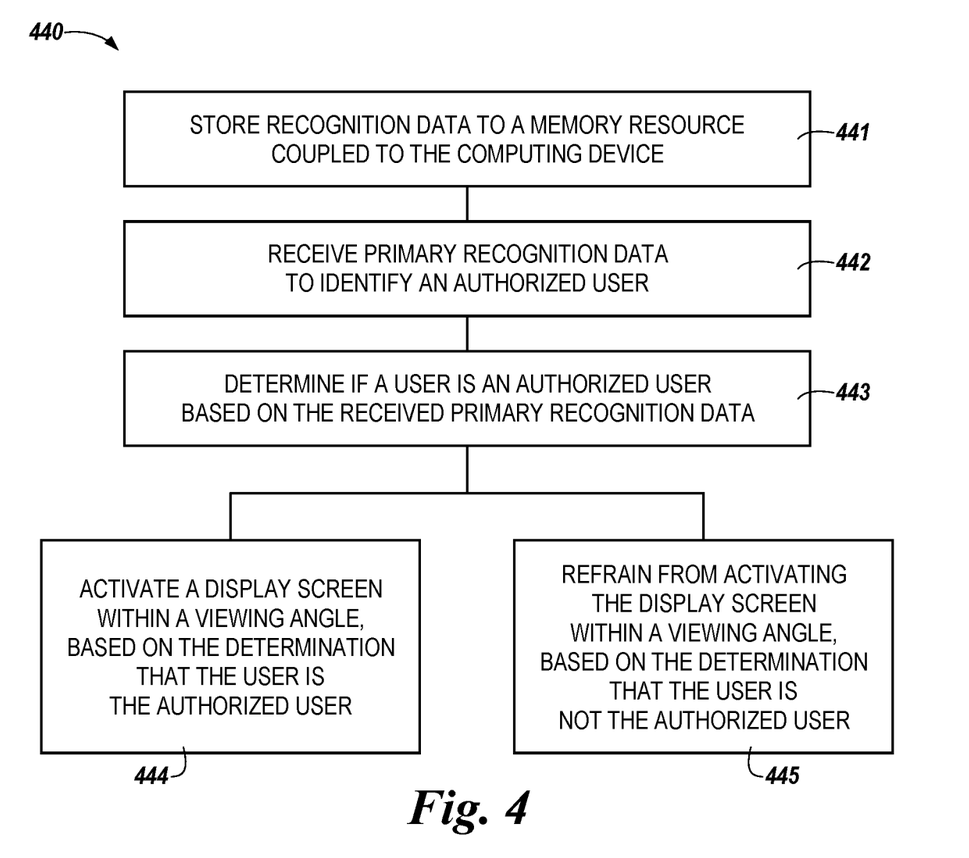
FIG. 4 is a block diagram for an example of activating a display screen of a computing device in accordance with a number of embodiments of the present disclosure.

FIG. 4 is a block diagram 440 for an example of activating a display screen of a computing device in accordance with a number of embodiments of the present disclosure. FIG. 4 describes an example of activating a display screen (e.g., the display screen 102 of FIG. 1) by a controller (e.g., the controller 108 of FIG. 1) based on receiving recognition data from an authorized user.

In an embodiment described in connection with FIG. 4, a controller can be coupled to a computing device and a memory resource (e.g., the memory resource 306 of FIG. 3). At 441, the block diagram 440, the controller may store recognition data to a memory resource coupled to the computing device. A user may provide recognition data to a computing device to identify them as an authorized user. The controller of the computing device may store the recognition data in the memory resource. In some examples, the controller may store a number of recognition data in the memory resource of the computing device. Each stored recognition data of the number of stored recognition data may be used to identify a user as an authorized user. The stored recognition data may be used to identify an authorized user when primary recognition data is received.

At 442, the block diagram 440, the controller may receive primary recognition data to identify an authorized user. To activate a display screen and view information and/or images thereon within a viewing angle a user my provide primary recognition data to a recognition sensor of a computing device. In some examples, a computing device may include a number of recognition sensors to receive different types of recognition data. For example, the computing device may receive recognition data in the form of fingerprint identification, a retina identification, a facial identification, an alphanumerical identification code, a pattern identification code, or a combination thereof. The recognition sensor may send the primary recognition data to the controller for analysis.

At 443, the block diagram 440, the controller may determine if a user is an authorized user based on the received primary recognition data. The controller may analyze received primary recognition data by comparing the primary recognition data to the stored recognition data and determine if a user is an authorized user. That is, a controller may authenticate primary recognition data by comparing the primary recognition data with the stored recognition data.

If the user is determined to be an authorized user the controller may activate a display screen within a viewing angle, at block 444. Activating a display screen within a viewing angle may prevent others near the authorized user from viewing the information and/or images on the display screen. That is, the authorized user may view private and/or confidential information and/or images on the computing device while preventing others outside the viewing angle from seeing the private and/or confidential information and/or images.

In contrast, if the controller determines that the user is an unauthorized user, the controller may refrain from activating the display screen within a viewing angle, at block 445. The controller may activate a display screen when an authorized user is viewing the display screen. However, if an unauthorized user provides the recognition sensor with primary recognition data, the controller may not activate the screen to prevent the unauthorized user from viewing the private and/or confidential information and/or images on the computing device.

Figure 5:
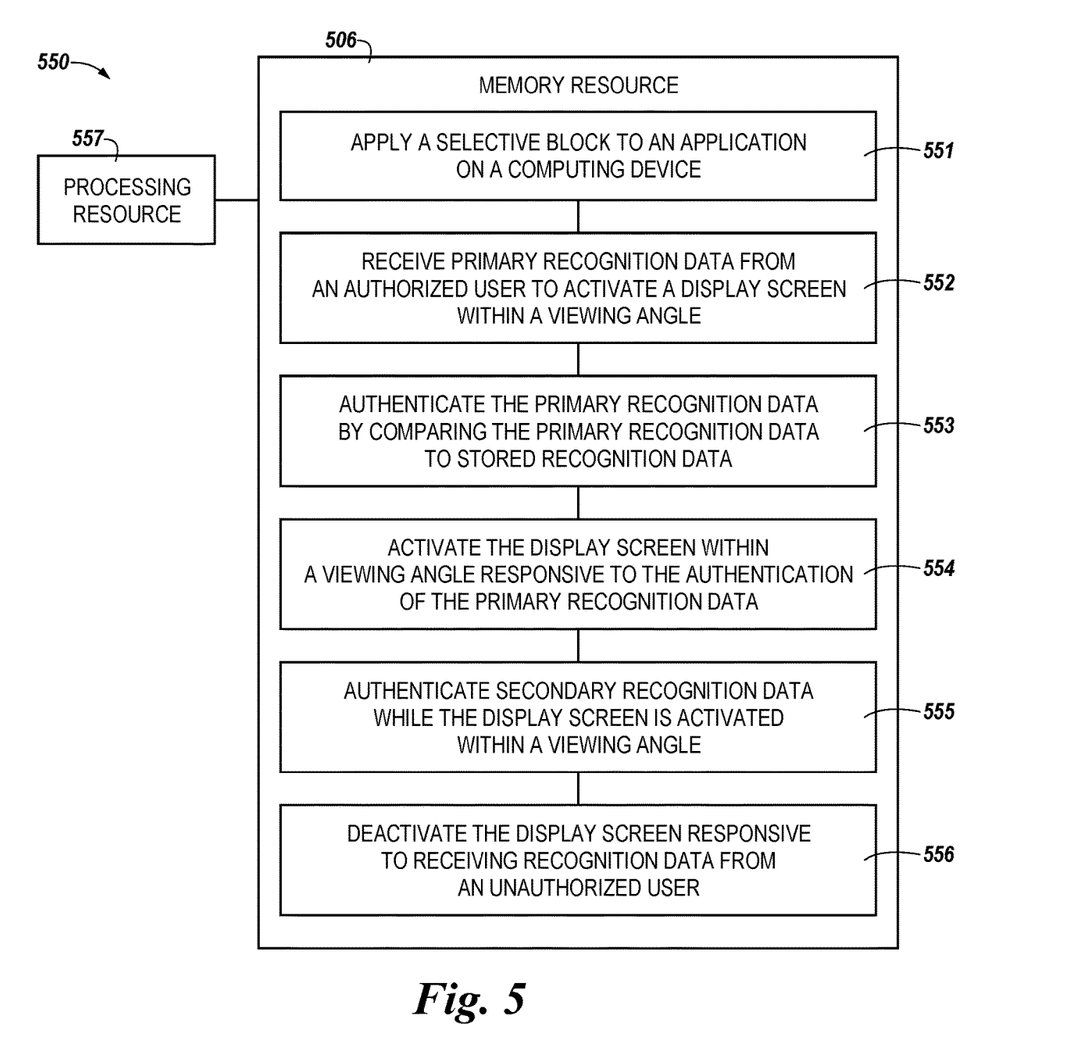
FIG. 5 is a functional diagram representing a processing resource in communication with a memory resource having instructions written thereon in accordance with a number of embodiments of the present disclosure.

FIG. 5 is a functional diagram representing a processing resource 557 in communication with a memory resource 506 having instructions 551, 552, 553, 554, 555, 556 written thereon in accordance with a number of embodiments of the present disclosure. FIG. 5 describes an example including instructions to activate a display screen (e.g., the display screen 102 of FIG. 1) by a processing resource 557 based on authentication of primary recognition data and performing a secondary authentication of secondary recognition data. The memory resource 506, in some embodiments, may be analogous to the memory resource 106 described with respect to FIG. 1. The processing resource 557, in some examples, may be analogous to the controller 108 describe with respect to FIG. 1.

A system 550 may be a server or a computing device (among others) and can include the processing resource 557. The system 790 may further include the memory resource 506 (e.g., a non-transitory MRM), on which may be stored instructions, such as instructions 551, 552, 553, 554, 555, and 556. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 506 may be electronic, magnetic, optical, or other physical storage device that stores executable instructions. Thus, the memory resource 506 may be, for example, a non-transitory MRM comprising Random Access Memory (RAM), an Electrically-Erasable Programmable ROM (EEPROM), a storage drive, an optical disc, and the like. The memory resource 506 may be disposed within a controller and/or computing device. In this example, the executable instructions 551, 552, 553, 554, 555, and 556 may be "installed" on the device. Additionally, and/or alternatively, the memory resource 792 can be a portable, external, or remote storage medium, for example, that allows the system 550 to download the instructions 551, 552, 553, 554, 555, and 556 from the portable/external/remote storage medium. In this situation, the executable instructions may be part of an "installation package". As described herein, the memory resource 506 may be encoded with executable instructions for display screen visibility based on identification of an authorized user.

The instructions 551, when executed by a processing resource such as the processing resource 557, may include instructions to apply, by a controller coupled to a computing device, a selective block to an application on a computing device. A controller may determine which applications of a computing device should include a selective block. The controller may determine which applications include a selective block based on pre-established settings, pre-determined or machine learned preference, and/or user input. In some embodiments, the controller may use a combination of pre-established settings, an anticipated level of privacy, and/or, pre-determined or machine learned preference, to determine which applications should include a selective block. In some example, the controller may apply the selective block to all applications on a computing device. In other examples, the controller may apply the selective block to application with a high privacy threshold.

The instructions 552, when executed by a processing resource such as the processing resource 557, may include instructions to receive, by a controller coupled to a computing device, primary recognition data from an authorized user to activate a display screen within a viewing angle. The controller of the computing device may activate a display screen within a viewing angle when an authorized user provides primary recognition data through a recognition sensor. For example, if an application on the computing device includes a selective block, an authorized user may have to provide primary recognition data before accessing the application.

The instructions 553, when executed by a processing resource such as the processing resource 557, may include instructions to authenticate, by a controller coupled to a computing device, the primary recognition data by comparing the primary recognition data to stored recognition data. Continuing with the previous example, after a user provides primary recognition data, the controller may authenticate the primary recognition data by comparing the primary recognition data to the stored recognition data. If the primary recognition data matches the stored recognition data, the controller may determine that the user is an authorized user and activate the display screen.

The instructions 554, when executed by a processing resource such as the processing resource 557, may include instructions to activate, by a controller coupled to a computing device, the display screen within a viewing angle responsive to the authentication of the primary recognition data. In some examples, after the controller determines that a user is an authorized user, the controller may activate the display screen. However, the controller may activate the viewing screen in a manner that allows only users within a viewing angle to view the information and/or images on the display screen. Activating a display screen within a viewing angle provides privacy to the user of the computing device when in the presence of others.

The instructions 555, when executed by a processing resource such as the processing resource 557, may include instructions to authenticate, by a controller coupled to a computing device, secondary recognition data while the display screen is activated within a viewing angle. In some examples, the controller may cause a recognition sensor to scan for secondary recognition data after the display screen has been activated. That is, the controller may receive secondary recognition data from a recognition sensor and perform secondary authentications of the secondary recognition data while the display screen is activated within a viewing angle. Performing secondary authentications of secondary recognition data may ensure that an authorized user is still within the viewing angle while the display screen is activated. Performing secondary authentications may increase the security of the computing device. For example, a user may provide a recognition sensor with primary recognition data. The controller may authentication the primary recognition data and activate the display screen within a viewing angle. After some time has passed an authorized user may put the computing device down and an unauthorized user may pick up the computing device and gain access to the information and/or images on the display screen. However, if the controller performs a secondary authentication with secondary recognition data received after the display screen has been activated within a viewing angle, an authorized user may not gain access to the information and/or images on the display screen.

The instructions 556, when executed by a processing resource such as the processing resource 557, may include instructions to deactivate, by a controller coupled to a computing device, the display screen responsive to receiving recognition data from an unauthorized user. In some examples, a controller may perform a number of authentications while a computing device is in use. For example, the controller may perform an authentication of the primary recognition data before activating a display screen within a viewing angle. In addition, the controller may perform an authentication of secondary recognition data after the display screen is activated within a viewing angle. In some examples, if the controller receives secondary recognition data from an unauthorized user after a display screen has been activated the controller may deactivate the display screen to prevent the unauthorized user from accessing the private and/or confidential information and/or images on the computing device.

Figure 6:
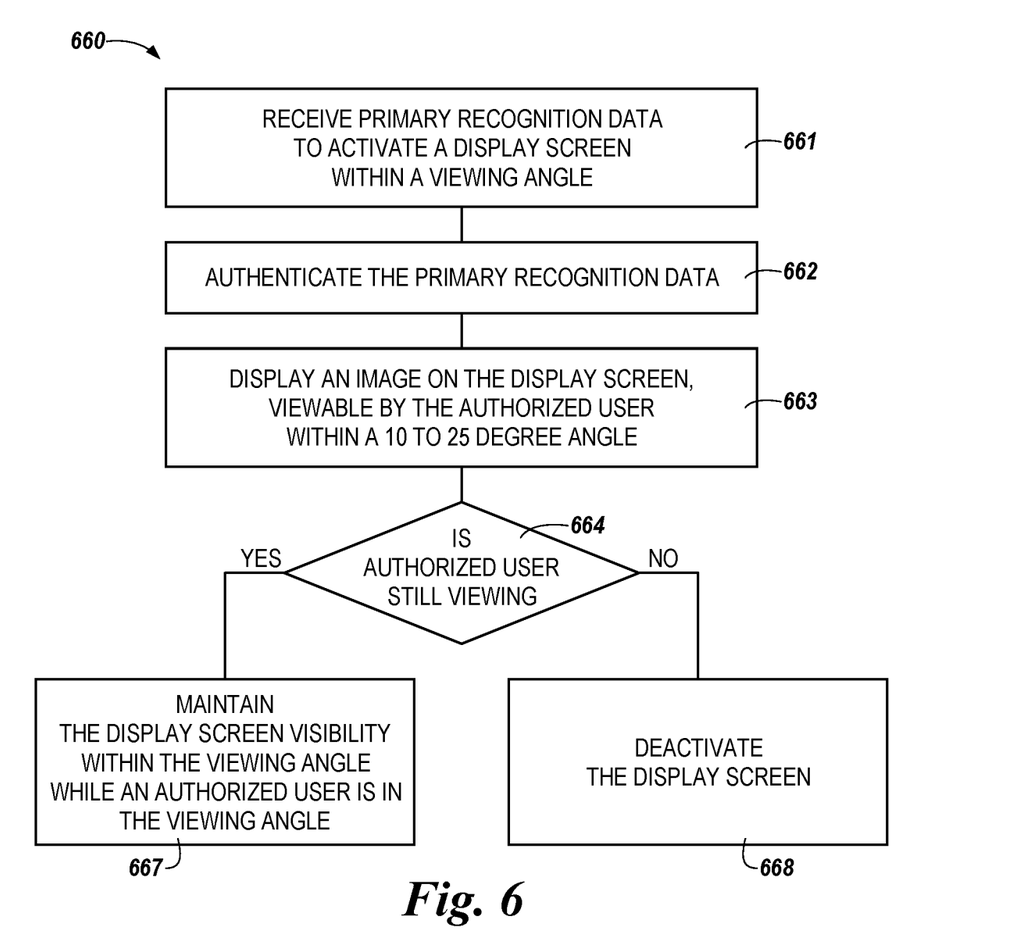
FIG. 6 is flow 660 diagram representing an example of a display screen activation in accordance with a number of embodiments of the present disclosure.

FIG. 6 is flow diagram 660 representing an example of a display screen activation in accordance with a number of embodiments of the present disclosure. FIG. 6 describes an example of applying a selective block to a display screen to prevent unauthorized users from viewing the display screen. As described herein in connection with FIGS. 4, a controller (e.g., controller 208 of FIG. 2) can be coupled to a computing device (e.g., computing device 300 of FIG. 3) and a memory resource (e.g., the memory resource 306 of FIG. 1).

At 661, the block diagram 660, the controller may receive primary recognition data to activate a display screen within a viewing angle. To ensure that the information and/or images of the computing device remain secure the controller may identify an authorized user with primary recognition data before activating a display screen within a viewing angle. At 662, the block diagram 660, the controller may authenticate the primary recognition data by comparing the primary recognition data to stored recognition data. The controller may compare both recognition data and determine if the authorized user provided the primary recognition data. If the primary recognition data is from an authorized user, the primary recognition data may allow a user to view information and/or images on a display screen within a viewing angle.

At 663, the block diagram 660, the controller may display an information and/or image on the display screen, viewable by the authorized user within a 10 to 25 degree angle. If a controller determines that the received primary recognition data belongs to an authorized user, the controller may activate the display screen within a viewing angle. For example, the viewing angle may be a 25 degree angle from the display screen. In some examples, the viewing angle may be a 20 degree angle from the display screen. That is, a user within a 20 degree angle from the display screen may be able to view the information and/or images on the display screen. While a user outside of the angle that is 20 degrees from the display screen may not be able to view the information and/or images on the display screen. In other examples, the viewing angle may be a 15 degree angle from the display screen. In yet another example, the viewing angle may be a 10 degree angle from the display screen.

At 664, the block diagram 660, the controller may prompt the recognition sensor to scan for secondary recognition data to ensure that the authorized user is still within the viewing angle. The controller may receive the secondary recognition data from a recognition sensor and determine if the secondary recognition data was provided by an authorized user. Based on the determination that an authorized user is still within the viewing angle, at 667, the controller may maintain the display screen visibility within the viewing angle. However, if it is determined that an authorized user is no longer within the viewing angle, at 668, the controller may deactivate the display screen.

Figure 7:
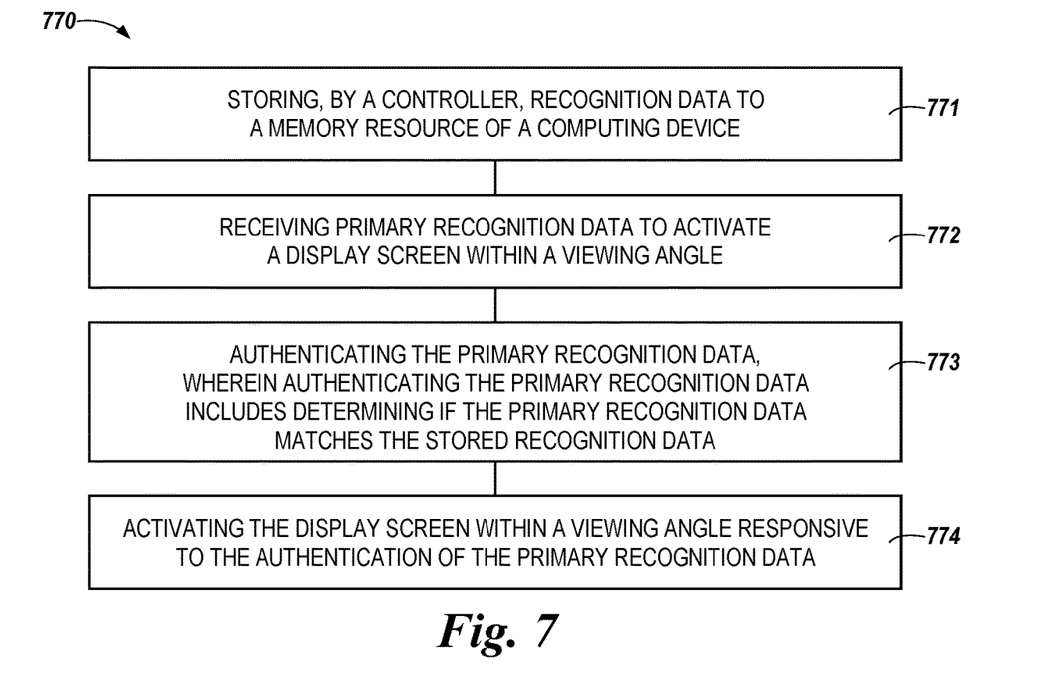
FIG. 7 is a flow diagram representing an example method for activating a display screen of a computing device in accordance with a number of embodiments of the present disclosure.

FIG. 7 is a flow diagram representing an example method 770 for activating a display screen of a computing device in accordance with a number of embodiments of the present disclosure. At 771, the method 770, includes storing recognition data in a memory resource of a computing device. A user may provide a computing device with recognition data to be stored in a memory resource before a selective blocking of a display screen is enabled. The stored recognition data may allow the controller to identify an authorized user when primary recognition data is received. That is, the primary recognition data may be compared to the stored recognition data to determine if the same user provided both recognition data.

At 772, the method 770, includes receiving primary recognition data to activate a display screen within a viewing angle. The recognition sensor may receive primary recognition data from a user. The controller may obtain the primary recognition data from the recognition sensor to determine if the received primary recognition data is from an authorized user.

At 773, the method 770, includes comparing the primary recognition data to the stored recognition data. The controller may determine if a user is an authorized user by comparing the received primary recognition data with stored recognition data. A user may be identified as an authorized user if the received primary recognition data matches the stored recognition data. In some examples, recognition data may be authenticated a number of times during the same use cycle. That is, the recognition sensor may obtain primary recognition data to activate a display screen within a viewing angle and then obtain secondary recognition data from a user substantially continuously, periodically, or at scheduled intervals during a use cycle. Each time primary recognition data and/or secondary recognition data are obtained it is compared to the stored recognition data to ensure that an authorized user is within the viewing angle.

At 774, the method 770, includes activating the display screen within a viewing angle responsive to authentication of the primary recognition data through the comparison of the primary recognition data and the stored recognition data. If the controller determines that the user is an authorized user based on the received primary recognition data, the controller may cause the display screen to activate within a viewing angle. An activated display screen may allow information and/or images to be seen within a specified angle range of the display screen. Activating the display screen within a specified angle range may prevent users outside the specified viewing range from viewing the information and/or images on the display screen.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory resource; and
   a controller coupled to the memory resource, wherein the controller is configured to:
   apply a selective block to an application on a computing device;
   receive primary recognition data from a user;
   authenticate the primary recognition data by comparing the primary recognition data to stored recognition data;
   activate a display screen such that the display screen is viewable within a viewing angle as measured from a plane normal to the display screen responsive to the authentication of the primary recognition data;
   analyze a user's usage pattern of the computing device; and
   receive secondary recognition data from the user at a frequency set based on the analyzed usage pattern of the computing device.

2. The apparatus of claim 1, wherein the controller is further configured to maintain a deactivated display screen responsive to receiving primary recognition data from an unauthorized user.

3. The apparatus of claim 1, wherein the controller is further configured to authenticate secondary recognition data while the display screen is activated such that the display screen is viewable within the viewing angle.

4. The apparatus of claim 1, wherein the controller is further configured to cause a recognition sensor to scan for secondary recognition data.

5. The apparatus of claim 4, wherein the controller is further configured to receive recognition data from a number of recognition sensors.

6. The apparatus of claim 1, wherein the controller is further configured to deactivate the display screen responsive to receiving secondary recognition data from an unauthorized user.

7. The apparatus of claim 1, wherein the controller is further configured to apply the selective block to the application based on a privacy threshold.

8. The apparatus of claim 1, wherein the controller is further configured to deactivate the display screen responsive to an interruption in receiving primary recognition data.

9. A method, comprising:
determining a type of application running on a computing device;
applying a selective block on a display screen of the computing device based on the type of application running on the computing device;
authenticating received primary recognition data provided by an authorized user;
activating the display screen within a viewing angle, as measured from a plane normal to the display screen, responsive to the authentication of the authorized user;
analyzing an authorized user's usage pattern of the computing device;
setting a frequency at which secondary recognition data is provided by the authorized user, based on the analyzed usage pattern of the computing device;
authenticating received secondary recognition data while the display screen is activated within the viewing angle; and
deactivating the display screen responsive to receiving secondary recognition data from an unauthorized user.

10. The method of claim 9, further comprising determining a privacy threshold of information for the type of application displayed on the display screen based on settings established by a controller and based on the type of application that is running on the computing device and an information displayed while using the application.

11. The method of claim 10, further comprising wherein applying a selective block on the display screen comprises activating the display screen, based on the determined privacy threshold, for the viewing angle responsive to authentication of the received primary recognition data through a comparison of the received primary recognition data and a stored recognition data.

12. The method of claim 9, wherein authenticating received secondary recognition data comprises comparing the secondary recognition data to a stored recognition data while the display screen is activated and viewable within the viewing angle.

13. The method of claim 9, further comprising applying the selective block to the application based on a user pre-established setting, an anticipated level of privacy, pre-determined or machine learned preference, or a combination thereof.

14. The method of claim 9, further comprising deactivating the display screen responsive to an interruption in receiving primary recognition data.

15. An apparatus, comprising:
a memory resource; and
a controller coupled to the memory resource, wherein the controller is configured to:
enable a selective block on a display screen responsive to an application starting on a computing device;
authenticate a user using primary recognition data received within a viewing angle as measured from a plane normal to the display screen of the computing device;
activate the display screen within the within the viewing angle;
analyze an authenticated user's usage pattern of the computing device;
set a frequency at which to determine whether the authenticated user remains in the viewing angle, based on the analyzed usage pattern of the computing device; and
determine if the authenticated user remains in the viewing angle.

16. The apparatus of claim 15, wherein the controller is configured to deactivate the display screen based on a determination that the authenticated user is not in the viewing angle.

17. The apparatus of claim 15, wherein the controller is configured to maintain the activated display screen based on a determination that the authenticated user remains in the viewing angle.

18. The apparatus of claim 15, wherein the recognition data comprises a fingerprint identification, a retina identification, a facial identification, an alphanumerical identification code, a pattern identification code, or a combination thereof.

19. The apparatus of claim 15, wherein the controller is configured to determine a privacy threshold of information for the application displayed on the display screen based on settings established by the controller and based on the application that is running on the computing device and an information displayed while using the application.

20. The apparatus of claim 19, wherein enable a selective block on the display screen comprises activating the display screen, based on the determined privacy threshold, for the viewing angle responsive to authentication of the primary recognition data through a comparison of the primary recognition data and a stored recognition data.

* * * * *